Nov. 4, 1969  J. P. PIETRZAK ET AL  3,475,921
COMBINATION FREEZING TRAY AND GRID
Filed May 19, 1967  2 Sheets-Sheet 2
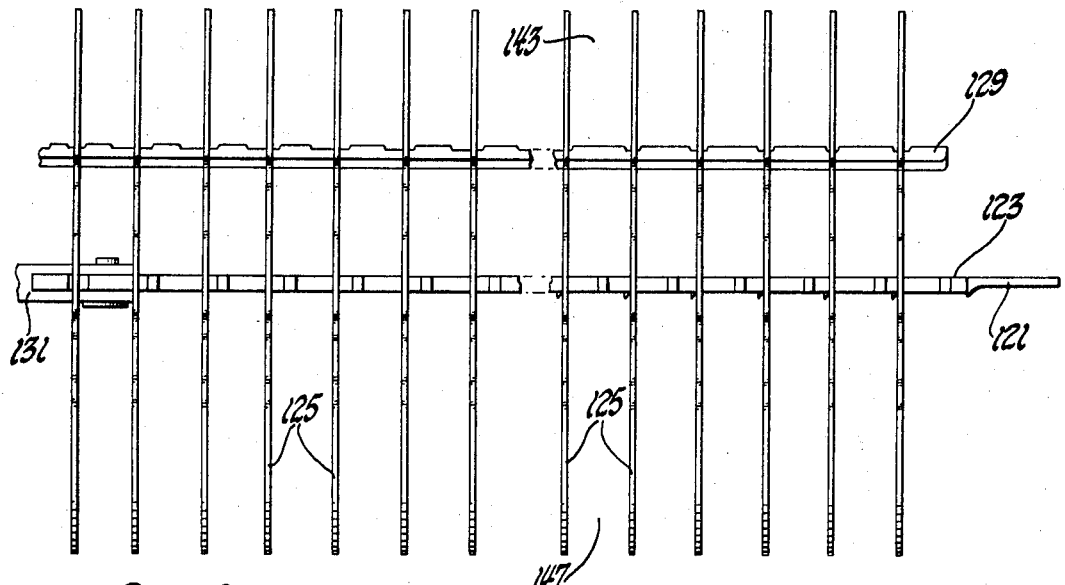
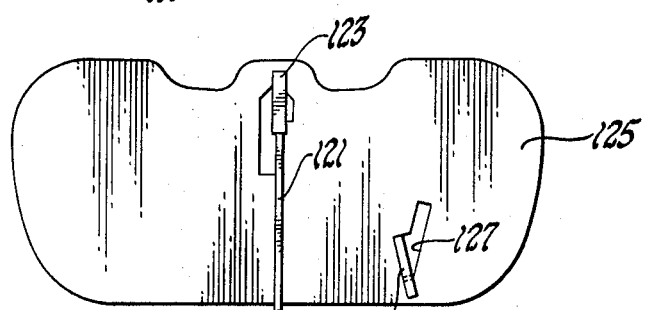
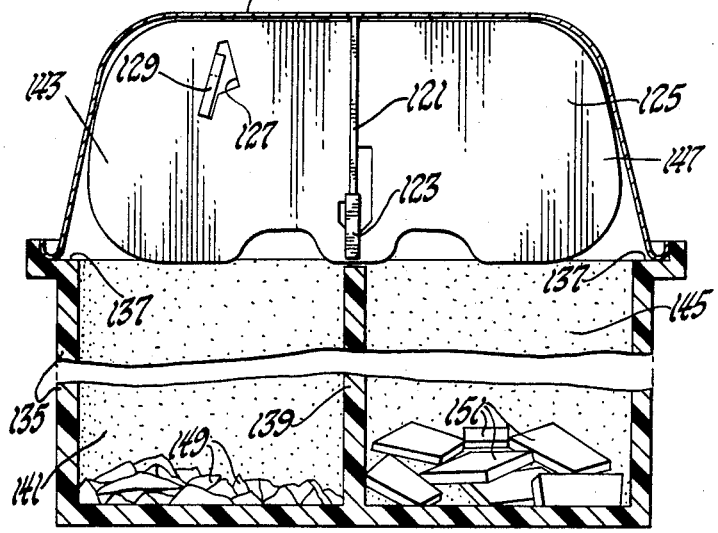
INVENTORS
Joe P. Pietrzak &
Robert M. Strahan
Carl A. Stickel
ATTORNEY United States Patent Office 3,475,921
Patented Nov. 4, 1969

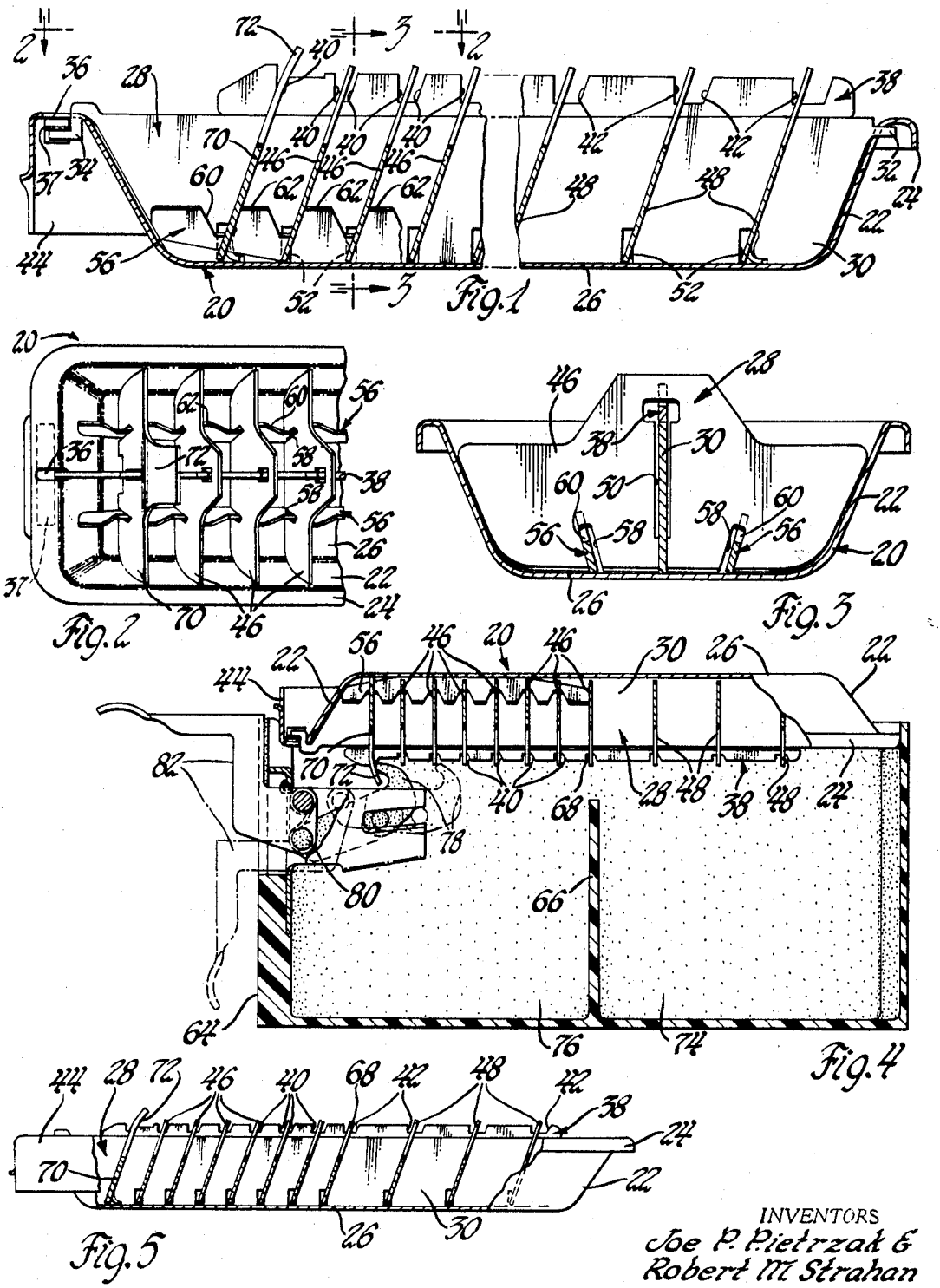

3,475,921
COMBINATION FREEZING TRAY AND GRID
Joe P. Pietrzak, Dayton, and Robert M. Strahan, Vandalia, Ohio, assignors to General Motors Corporation, Detroit, Mich., a corporation of Delaware
Filed May 19, 1967, Ser. No. 639,846
Int. Cl. F25c 1/24, 5/18
U.S. Cl. 62—320      10 Claims

ABSTRACT OF THE DISCLOSURE

In the first form, a freezing tray is provided with a grid having half thereof provided with closely spaced transversely movable walls to provide thin freezing compartments and the other half of the tray is provided with widely spaced transverse walls to provide cubical freezing compartments. As an option, the bottoms of the closely spaced transverse walls may also be provided with angularly positioned slots receiving toothed breaker bars extending on opposite sides of the longitudinal wall to break the frozen liquid into much smaller pieces or chips or pellets. The freezing tray with its frozen contents is inverted over a receiving bin having a separating wall aligned with the midpoint of the grid so that each half of the tray is over a separate subcompartment on opposite sides of the separating wall of the bin. An ejector mechanism mounted on the bin moves the movable walls to discharge the cubes into the one subcompartment and the remainder of the frozen liquid in either the form of slices or crushed pellets into the other subcompartment.

In the second form, the grid is provided with closely spaced transversely movable walls to provide thin freezing compartments. On one side only the transverse walls are provided with aligned slots through which extend a toothed breaker bar. The receiving bin is provided with a longitudinal separating wall beneath the central longitudinal wall of the grid. When the actuating bar of the grid is operated to move the transverse walls, the frozen liquid on the side provided with the breaker bar is broken into small pellets or chips and deposited into the one subcompartment beneath while slices of frozen liquid are deposited into the subcompartment on the opposite side.

Occasionally, it is desirable to have ice or frozen liquid of two different types for different purposes at the same time.

It is an object of this invention to provide a simple arrangement of a grid, tray and receiving bin by which two different types of frozen liquid are formed in the freezing compartment of the tray which can be ejected into and kept separate in two subcompartments of the bin.

These and other objects are attained in the form shown in the drawings in which one half of the grid is provided with closely spaced movable transverse walls and the other half with widely spaced transverse walls providing one half of the tray with narrow freezing compartments and the other half with cubical freezing compartments. The closely spaced transverse walls are provided with one or two angularly positioned toothed breaker bars. When the tray is inverted over the bin, the opposite halves of the grid are located on opposite sides of a separating wall dividing the receiving bin into separate subcompartments beneath each half of the tray. An ejector mechanism moves the movable walls to eject one of the forms of frozen liquid into the one subcompartment and the other form of frozen liquid into the second subcompartment.

Further objects and advantages of the present invention will be apparent from the following description, reference being had to the accompanying drawings, wherein preferred embodiments of the present invention are clearly shown.

In the drawings:

FIGURE 1 is a vertical sectional view of a freezing tray showing the combination grid embodying one form of my invention;

FIGURE 2 is a fragmentary plan view of a portion of FIGURE 1 as indicated by the arrow 2;

FIGURE 3 is a transverse vertical sectional view taken along the line 3—3 of FIGURE 1;

FIGURE 4 is a longitudinal sectional view of the inverted pan and grid over a divided receiving bin;

FIGURE 5 is a vertical sectional view of a modified form of freezing tray and grid;

FIGURE 6 is a plan view of another modified form of grid having a single breaker bar;

FIGURE 7 is an end view of the grid shown in FIGURE 6; and

FIGURE 8 is a transverse vertical sectional view through an inverted tray containing a grid shown in FIGURE 7 over a longitudinally separated receiving bin.

Referring now more particularly to FIGURES 1 to 3, there is shown a freezing tray 20 in the form of a metal pan having a bottom 26, sloping side walls 22 and a curled rim 24. The pan contains a grid 28 having a lower longitudinal wall 30 provided with a rear projection 32 held in a slot in the rear portion of the rim 24 and a Z-shaped front projection 34 extending through a slot 36 in the front portion of the rim 24 and held in place by a transverse leaf spring 37. Slidably mounted upon the top of the lower longitudinal wall 30 is the upper longitudinal wall 38 which also forms an actuating bar. Approximately one half of the upper wall or actuating bar 38 is provided with a series of closely spaced notches 40 in its upper surface while the other half is provided with a series of widely spaced notches 42. The notches 40 and 42 progressively increase in width from the handle 44 at the front to the rear in a single series to provide progressive actuation of the transverse movable walls 46 and 48 which have aligned central slots 50 receiving both the upper and lower longitudinal walls 30 and 38. The bottom of the lower longitudinal wall also has a series of notches 52 of substantially uniform width in which the front half are closely spaced and the rear half are widely spaced to form narrow freezing compartments in the front half of the tray on the front side of the central transverse dividing wall 68 and wide substantially cubical freezing compartments in the rear half of the tray at the rear of the central dividing wall 68. The tray thus far described is identical to the tray shown in FIGURE 5 and will form narrow slices of frozen liquid or pellets in the narrow front compartments between the transverse walls 46 and cubical pellets of frozen liquid in the rear compartment between the transverse walls 48. The spacing of the transverse walls 48 is substantially twice as great as the spacing of the transverse walls 46.

As an optional feature of the invention, the front half of the tray having the closely spaced transverse walls 46 forming the narrow freezing compartments is provided adjacent to the bottom 26 of the tray 20 on opposite sides of the lower longitudinal wall 30 with outwardly and upwardly diverging aligned slots 58 receiving a pair of toothed longitudinally extending rectangular breakers bars 56 having sides which diverge outwardly and upwardly in conformity to the aligned slots 58. The breaker bars 56 are provided with notches 60 along their upper edge which receive the adjacent portions of the transverse walls 46. Between the notches 60 there are upwardly projecting teeth 62 to which the ice or frozen liquid adheres. The above described tray 20 and the grid 28 are placed in an inverted position over a receiving bin 64. According to another feature of our invention, this receiving bin 64 is provided with a vertical separating wall 66 extending parallel to the front and rear walls between the side walls of the bin directly in alignment with the central transverse dividing wall 68 of the grid 28 which divides the grid 28 and the tray 20 into a front half containing narrow freezing compartments between the closely spaced transverse walls 46 and in the rear half the widely spaced transverse walls 48. The front transverse wall 70 nearest the handle is made of thicker material and preferably has an additional projection 72. Any form of actuator mechanism may be applied to this projection 72 to move the upper longitudinal wall 28 and to progressively move the remaining transverse walls 46 and 48 in a single series of progressive movements to first eject crushed ice into the front compartment 76 of the bin 64 and thereafter to eject the cubes from between the widely spaced movable walls 48 into the rear compartment 74 of the bin 64.

As one example of ejection mechanism, there is provided a hook-shaped member 78 which is adapted to be connected by the pin 80 to the operating lever 82 shown in dot-dash lines in the initial position. When the operating lever 82 is lifted to the full line position, the hook-shaped member 78 is moved rearwardly to engage and move forwardly the projection 72 to move forwardly the upper longitudinal wall or actuator bar 38 and progressively in a single series the transverse walls 46 and 48. This causes the ejection of the front half of the contents of the tray 20 into the compartment 76 and the rear half of the contents into the compartment 74. This provides crushed ice or crushed frozen liquid in the compartment 76 and ice cubes or cubes of frozen liquid in the compartment 74.

If the breaker bars 62 are removed or omitted the tray takes the form shown in FIGURE 5. Since the corresponding parts are substantially identical to those shown in FIGURES 1 to 3, they bear the same reference characters. when the tray shown in FIGURE 5 is filled with liquid and the liquid is frozen and the tray and its contents are inverted over the receiving bin 64 as previously described, upon operating the ejector handle 82 the tubes will be ejected into the rear compartment 74 as before and the narrow slices of frozen liquid or ice between the transverse walls 46 will be ejected into the front compartment 76. Thus, by this arrangement two different forms or sizes of ice or frozen liquid can be obtained from a single tray and separately stored in a very simple and convenient manner.

In the form shown in FIGURES 6 to 8, the grid is formed of a central longitudinal upright wall 121 over which is provided a notched actuating bar or wall 123. These extend through a series of closely spaced transverse walls 125 having webs at the top seated in the notches of the actuating bar 123 and webs at the bottom located within notches in the bottom of the longitudinal wall 121 in a manner similar to those illustrated in FIGURES 1, 4 and 5. According to the second form of the invention, each of the transverse walls 125 are provided with a series of aligned slots 127 on one side only through which extends the flat rectangular breaker bar 129 which may have notches in its lower surface. The slots are so shaped so as to hold the breaker bar in a position in which it is tilted inwardly. The shape of the slot also normally prevents the breaker bar from being dislodged. No breaker bar is provided on the opposite side of the longitudinal wall 121 and therefore no slots are required. The grid is provided with a lever-type actuator 131 which moves the upper longitudinal actuating bar 123 and the upper portions of the transverse walls 125 relative to the lower longitudinal wall 124 and the lower portions of the transverse walls.

When the grid shown in FIGURES 6 and 7 is placed into a tray 133 and liquid is frozen therein the tray and grid may be placed in an inverted position upon the ledges 137 at the top of the receiving bin 135 shown in FIGURE 8.

The receiving bin 135 is provided with a central upright longitudinal wall 139 in alignment with the longitudinal walls 121 and 123 of the grid. This forms on one side of the wall 139 a subcompartment 141 beneath the compartments 143 of the grid containing the breaker bar 129 and upon the opposite side of the wall 139 a second subcompartment 145 beneath the compartments 147 of the grid without the breaker bar. When the actuator 131 is operated to move the actuating bar 123 the transverse walls 125 will be moved to break the frozen liquid in the compartments 143 into small chips 149 which will fall into the bottom of the subcompartments 141 while the frozen liquid from the compartments 147 on the opposite side of the walls 121, 123 will be deposited in the form of frozen slices 151 in the bottom of the subcompartment 145 on the right side of the wall 139. This form, therefore, also shows a way in which a grid in a single tray may be operated to provide two different sizes of frozen liquid which are kept separate and deposited into the separate subcompartments of a receiving bin. This, therefore, provides for the separate storage of two different sizes of frozen pellets.

While the embodiments of the invention as herein disclosed constitute preferred forms, it is to be understood that other forms might be adopted.

What is claimed is as follows:

1. In the combination of a receiving bin and a freezing tray adapted to be placed in an inverted position over the receiving bin, said freezing tray including a grid having an upright longitudinal wall and movable transverse walls intersecting said longitudinal wall to form liquid freezing compartments wherein the improvement comprises means associated with the grid to provide two different freezing compartment arrangements for providing different sized frozen pellets, and means for moving said movable walls to discharge from the inverted freezing tray different sized frozen pellets, said bin being provided with a separating wall aligned with said freezing trap and grid to separate the two different forms of pellets as they are discharged from the freezing tray and grid and to divide the interior of said bin into two different subcompartments, one of which is located beneath one freezing compartment arrangement and receives one size of frozen pellet and the other of which is located beneath another freezing compartment arrangement and receives another size of frozen pellet.

2. A combination as defined in claim 1 in which the freezing tray and grid and receiving bin have ends and one of said different freezing compartment arrangements is located in one end of said grid and tray and the second different freezing compartment arrangement is located in the other end of the grid and tray, and in which said separating wall separates the two ends of said bin into compartments beneath the opposite ends of said grid and tray.

3. A combination as defined in claim 1 in which one of the freezing compartment arrangements is provided by closely spacing the transverse walls along one portion of the longitudinal wall and the other freezing compartment arrangement is provided by widely spacing the transverse walls along another portion of the longitudinal wall.

4. A combination as defined in claim 1 in which breaker bars extend on opposite sides and parallel to one portion of the longitudinal wall adjacent the bottoms of said transverse walls for breaking the frozen liquid formed between said transverse walls, the remainder of said transverse walls being without the breaker bars to provide substantially unbroken frozen pellets between said remaining walls.

5. A combination as defined in claim 1 in which the movable transverse walls adjacent one portion of the longitudinal wall are closely spaced and the remaining transverse walls are widely spaced, said closely spaced transverse walls having breaker bars extending transversely of their lower portions along side of and substantially parallel to the adjacent portion of the longitudinal wall to break the frozen liquid formed between said closely spaced movable transverse walls.

6. A grid for a freezing tray including an upright longitudinal wall, a first series of closely spaced movable transverse walls intersecting said longitudinal wall to form thin liquid freezing compartments, and a second series of widely spaced movable transverse walls spaced a plurality of times the spacing of said first series intersecting said longitudinal wall to form wide liquid freezing compartments.

7. A grid as defined in claim 6 in which the widely spaced transverse walls are spaced substantially twice the distance of the spacing of the closely spaced transverse walls.

8. A grid for a freezing tray including an upright longitudinal wall and movable transverse walls intersecting said longitudinal wall to form liquid freezing compartments, wherein the improvement comprises longitudinally extending breaker bars on opposite sides of the longitudinal bars extending through the lower portion of a first series of said liquid freezing compartments and a lower portion of a first series of said transverse walls, said series being substantially less than all of said transverse walls and compartments and said breaker bars being substantially less in length than said longitudinal wall and being substantially equal in length to the length of said first series of compartments for cracking the ice in said first series, a substantial number of the freezing compartments and transverse walls constituting second series without said breaker bars therein for producing substantially unbroken frozen pellets.

9. A grid as defined in claim 8 in which said first series of transverse walls are spaced apart substantially half the distance of the spacing of said second series.

10. A combination as defined in claim 1 in which the freezing tray and grid and receiving bin have sides extending on opposite sides of said longitudinal wall and said separating wall, said separating wall extending longitudinally beneath said longitudinal wall to locate one of the subcompartments of said bin beneath one of the sides of said grid and tray and to locate the other subcompartment beneath the other side of said grid and tray.

References Cited

UNITED STATES PATENTS

| | | | |
|---|---|---|---|
| 2,955,440 | 10/1960 | Erickson et al. | 249—72 X |
| 3,147,603 | 9/1964 | Kniffin | 249—71 X |
| 3,335,578 | 8/1967 | Strahan. | |
| 3,386,698 | 6/1968 | Albright | 249—72 X |
| 3,398,552 | 8/1968 | Pietrzak | 62—320 |
| 3,412,572 | 11/1968 | Kesling | 62—344 |

J. HOWARD FLINT, JR., Primary Examiner

U.S. Cl. X.R.

62—344; 249—71, 131